(No Model.)
E. M. BENTLEY.
ELECTRIC LOCOMOTIVE.
No. 511,988. Patented Jan. 2, 1894.
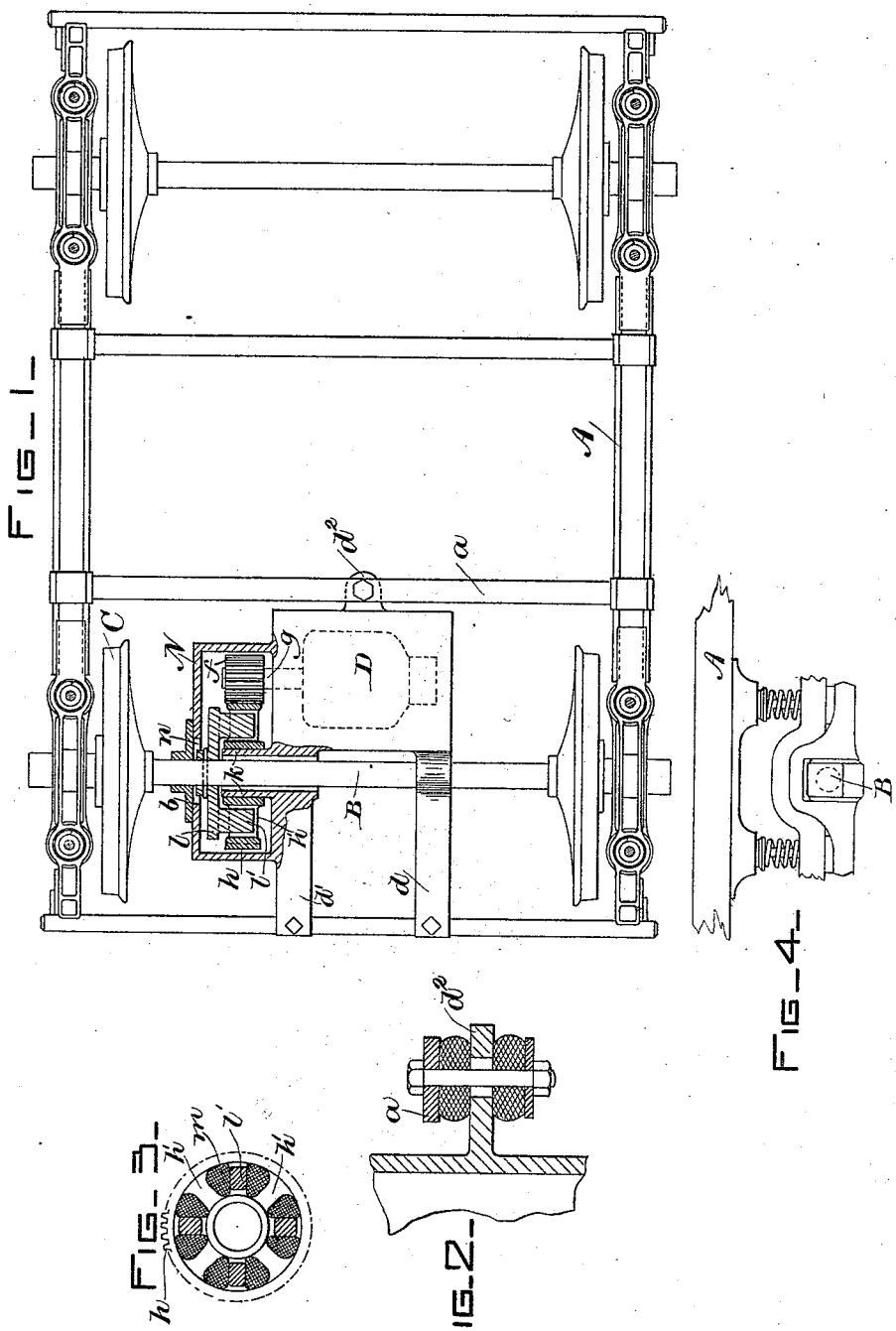
WITNESSES:
INVENTOR:
Edward M. Bentley
by Bentley & Blodgett
ATTYS.

UNITED STATES PATENT OFFICE.

EDWARD M. BENTLEY, OF BOSTON, MASSACHUSETTS.

ELECTRIC LOCOMOTIVE.

SPECIFICATION forming part of Letters Patent No. 511,988, dated January 2, 1894.

Application filed October 24, 1891. Serial No. 409,733. (No model.)

*To all whom it may concern:*

Be it known that I, EDWARD M. BENTLEY, a citizen of the United States, residing at Boston, in the county of Suffolk and State of Massachusetts, have invented a new and useful Improvement in Electric-Railway Motors, of which the following is a specification.

This invention relates to improvements in electric railway motors and more especially to the means for supporting the electric motor and for connecting it to the axles.

In the accompanying drawings Figure 1 is a plan view of an electric car truck, motor, and driving connections arranged according to my invention. Figs. 2, 3, and 4 show details.

In carrying out my invention the car or truck frame proper, A, is constructed and supported in any usual or desirable manner on the axles B and wheels C. The construction preferred is that wherein the said truck frame is spring-supported on bearings journaled on the axles and is thereby adapted to directly support the car body. To one or both of the axles I apply a driving electric motor D whose frame or body portion has rearward and forward extensions $d$, $d'$, $d^2$, whereby it is supported from the cross beams $a$ of the truck frame, preferably through the intervention of springs or cushions, as shown in Fig. 2. The motor is thus entirely spring-supported and out of rigid contact with the axle so that jars or shocks communicated to the latter will be communicated with diminished force or not at all, to the motor. To render this motor support efficient for the above mentioned purpose it is necessary that the driving connection between the motor and axle should be such as not to transmit such jars or shocks, or in other words, should be of a yielding or flexible nature. At the same time it is desirable that the motor shaft and axle should be parallel and be connected by straight or ordinary pinion and spur gears, for the reason that bevel gears are highly inefficient and otherwise disadvantageous, especially in connection with the flexible coupling as they bring undue lateral strain thereon. I therefore provide a straight or parallel tooth pinion $f$ on the armature shaft $g$, and a spur gear $h$, engaging with said pinion and journaled on a hollow bearing $k$ loosely surrounding the axle which is to be driven.

By the expression "loosely surrounding the axles," I mean that sufficient play or space is left between the hollow bearing and the axle to allow of such slight relative oscillations of the motor frame and axle as occur in running over the track, without bringing the axle into contact with the hollow bearing, except perhaps under unusually violent displacements. The spur gear $h$ is connected to the axle through a flexible or yielding coupling or connection, which may consist of interlocking arms $h'$, $l'$, respectively on the spur gear and on a collar or other part $l$ fixed on the axle, and cushions or springs $m$ interposed between said interlocking or interprojecting arms, as shown in Fig. 3. This construction transmits the torque from the spur gear to the axle, while the cushions enable a certain amount of relative lateral movement of the axle and gear wheel and serve to deaden the jarring action. Any other form of flexible or yielding coupling may be used provided it accomplishes substantially the above result.

I prefer to inclose the above described gearing within a protecting and dust-proof casing N, and this casing, as well as the hollow bearing $k$, may be attached to or formed with the motor frame and one of its extensions as $d'$; in fact the hollow bearing $k$ may form an integral part of the extension or support $d'$ for the motor. The aforesaid casing N has an aperture $n$, through which the axle passes freely so as not to touch the casing in normal running, and this aperture is closed against dust, &c., by a cover or collar $b$ on the axle.

What I claim as new, and desire to secure by Letters Patent, is—

1. The combination with the axles of a car truck and the frame spring-supported on said axles, of an electric motor supported at both ends on said frame and having its armature shaft parallel with an axle, a pinion on said shaft, a gear wheel meshing therewith, and a flexible or yielding connection between said gear wheel and the axle permitting variation of the radial distance of the armature and said gear from the axle without interfering with the action of the gears.

2. The combination with the axles of a car truck and the spring supported frame journaled thereon, of an electric motor supported on said frame and thereby given a play relatively to the axles and having its armature shaft parallel with a car axle and carrying a pinion, a spur gear wheel engaging with said pinion and journaled on a hollow bearing loosely surrounding the axle and carried by the motor frame, and a flexible or yielding coupling between the said spur wheel and the axle.

3. The combination with the car axles and the spring supported truck or frame, of an electric motor having a frame provided with forward and rearward extensions connected to said spring supported truck for support of the motor, a hollow journal bearing on one of such extensions, loosely surrounding an axle, the motor armature shaft being parallel to said axle and connected thereto through a pinion on said shaft, and a spur gear journaled on said hollow bearing and connected to the axle through a flexible coupling.

4. The combination with the axles and the truck frame spring-supported thereon, of a motor supported at both ends upon such truck frame and connected with the axle through a gearing upon a hollow sleeve surrounding the axle and a flexible coupling, a casing inclosing such gearing and having an aperture as large as the play of the axle in the sleeve requires, and a cover or collar upon the axle, closing such aperture in all positions of the axle relative thereto.

In witness whereof I have hereunto set my hand this 15th day of October, 1891.

EDWARD M. BENTLEY.

Witnesses:
ARTHUR P. KNIGHT,
C. L. HAYNES.